United States Patent
Zuili

(10) Patent No.: US 7,336,784 B2
(45) Date of Patent: Feb. 26, 2008

(54) MULTIMEDIA DECODER METHOD AND SYSTEM WITH AUTHENTICATION AND ENHANCED DIGITAL RIGHTS MANAGEMENT (DRM) WHERE EACH RECEIVED SIGNAL IS UNIQUE AND WHERE THE MISSING SIGNAL IS CACHED INSIDE THE STORAGE MEMORY OF EACH RECEIVER

(75) Inventor: Patrick Zuili, Boca Raton, FL (US)

(73) Assignee: Brite Smart Corporation, Boca Raton, FL (US)

( * ) Notice: Subject to any disclaimer, the term of this patent is extended or adjusted under 35 U.S.C. 154(b) by 698 days.

(21) Appl. No.: 10/324,896

(22) Filed: Dec. 20, 2002

(65) Prior Publication Data

US 2004/0123125 A1    Jun. 24, 2004

(51) Int. Cl.
*H04N 7/167* (2006.01)
(52) U.S. Cl. .................................................. 380/200
(58) Field of Classification Search ................ 713/192, 713/178; 380/200, 236, 211
See application file for complete search history.

(56) References Cited

U.S. PATENT DOCUMENTS

| | | | | |
|---|---|---|---|---|
| 5,341,425 A |  | 8/1994 | Wasilewski et al. | 380/20 |
| 5,870,474 A | * | 2/1999 | Wasilewski et al. | 380/211 |
| 6,064,739 A | * | 5/2000 | Davis | 380/200 |
| 6,243,469 B1 | * | 6/2001 | Kataoka et al. | 380/255 |
| 6,243,496 B1 | * | 6/2001 | Wilkinson | 382/245 |
| 2002/0076050 A1 | * | 6/2002 | Chen et al. | 380/231 |
| 2002/0085515 A1 | * | 7/2002 | Jaynes et al. | 370/329 |
| 2002/0124182 A1 | * | 9/2002 | Bacso et al. | 713/200 |
| 2002/0144153 A1 | * | 10/2002 | LeVine et al. | 713/201 |
| 2002/0146125 A1 | * | 10/2002 | Eskicioglu et al. | 380/255 |
| 2003/0177347 A1 | * | 9/2003 | Schneier et al. | 713/151 |
| 2003/0191946 A1 | * | 10/2003 | Auer et al. | 713/182 |
| 2004/0001591 A1 | * | 1/2004 | Mani et al. | 380/210 |

\* cited by examiner

*Primary Examiner*—Emmanuel L. Moise
*Assistant Examiner*—Ali Abyaneh
(74) *Attorney, Agent, or Firm*—Joe Zheng

(57) ABSTRACT

An audio/video distribution system with enhanced digital rights management. configured for use with a source of programming, a third party responsible for authorization, and an audio/video output device at a recipient location, includes a source encryptor and a receiver and authentication device disposed at a recipient location. The source encryptor is responsible for transmitting the programming (including any applicable plus policies, rights and/or rules) in encrypted form with missing content to the recipient location. The receiver includes an input for receiving the programming, a decryptor, an output for delivering the programming to the audio/video output device, a bi-directional link for communicating with a third party authenticator, a sensor for receiving a programming request from the programming request device, and a processor. In response to a request for the programming, the processor is operative to send a signal to the third party, cause the decryptor to decrypt the programming and add the missing content in response to an authorization signal from the third party, and output the programming to the audio/video output device.

35 Claims, 2 Drawing Sheets

MULTIMEDIA DECODER METHOD AND
SYSTEM WITH AUTHENTICATION AND
ENHANCED DIGITAL RIGHTS
MANAGEMENT (DRM) WHERE EACH
RECEIVED SIGNAL IS UNIQUE AND
WHERE THE MISSING SIGNAL IS CACHED
INSIDE THE STORAGE MEMORY OF EACH
RECEIVER

FIELD OF THE INVENTION

This invention relates generally to video pay-per-view services and, in particular, to a new network architecture including an embedded rights management system for greater security and harsher penalties for illegal reception and decoding.

BACKGROUND OF THE INVENTION

Pay-per-view (PPV) is a technology that allows cable and satellite television subscribers to access movies and special one-time-only events by paying a pre-announced fee for the special programming. Most cable system operators now offer two or more PPV channels to their customers.

A typical existing network architecture is shown in FIG. 1. The PPV signal 102 is scrambled until the cable subscriber chooses to view the programming, at which time the subscriber contacts the provider 104 either by phone modem 106 in a set-top box 110 or by interactive hand-held remote control to order the movie or event. Following the order, a computer 120 at billing subscriber management call center activates a video decoder/decryption system at the location of the subscriber that descrambles the ordered PPV program signal for the program's duration. A smart card reader 122 may also facilitate decryption based on smartcard content 124. For example, the smart card may act as a cache memory for particular PPV transactions. In any case, the PPV purchases are totaled by the computer 120 and added to the cable subscriber's monthly bill.

The history of PPV dates back to the mid 1970s, when Coaxial Communication began providing a service called Telecinema that offered movies priced at $2.50 per title. In the mid 1980s satellite distributed national PPV services began to appear. By the mid 1990s, more than one-third of all cable households in the U.S. took advantage of addressable PPV programming.

Movies occupy most PPV network schedules. Movies that performed well at the box office are released first to home video following their initial theatrical run. Only after videocassette versions of the movies have been available for rental or purchase for a period (called a "window") ranging from 30 to 90 days are they then available for PPV. The PPV event category may be subdivided primarily into sports and concerts. Sports, particularly professional boxing and wrestling, occupies the largest share of the category, followed by professional baseball, football, basketball and hockey and college football. The next step in the PPV evolution will be video-on-demand (VOD), a technology that allows addressable subscribers to order PPV movies at start times determined by the subscribers rather than the providers. An array of movie titles will be digitally stored in a file server located at the cable system head-end and distributed to subscribers as ordered. The movies will be converted from digital back to analog at the subscriber's household for viewing on analog-based television receivers. VOD testing in several U.S. cities began in 1994.

Techniques for protecting such information against unauthorized access are becoming increasingly important as more and more communications systems are employing digital transmission techniques. The subscription television industry, for example, is beginning to move toward all digital transmission systems or hybrid systems that employ both digital and analog transmission. Preventing unauthorized access to digital television signals is a major concern in the subscription television industry.

Digital Rights Management (DRM) is an emerging and vital business concept driven by the need for secure electronic distribution of high-value digital content. In its purest form, DRM provides a technology platform to allow trusted packaging, flexible distribution and managed consumption of digital content over wide-area networks, including those which employ Internet Protocol (IP). It is the goal of DRM to provide content owners, service providers, distributors and retailers with a safe, secure method for meeting the consumer's need for interactive, on-demand access to movies, online games, books, music and critical/proprietary software data and other, emerging types of digital media.

At the present time, cryptography is used to prevent unauthorized access to subscription video programming. A typical system includes a data encryptor and decryptor on either end of a transmission medium. Existing data encryptors generally employ a pseudorandom bit generator and a data combiner. The pseudorandom bit generator receives a unique encryption key as a "seed" value, then generates a pseudorandom binary sequence commonly referred to as a "key stream." A combiner is used to combine or mix the information stream with the key stream, typically on a bit-by-bit basis. The encrypted data stream may then be transmitted via any suitable transmission medium, such as satellite or cable.

A decryptor recovers the data stream from the encrypted data stream. Using private key cryptographic schemes, the decryptor must be provided with the same encryption key that was used to encrypt the data in the first place, and the pseudorandom bit generator must be identical to pseudorandom bit generator at the "head end." The reproduced key stream and the encrypted data stream are then provided to respective inputs of the de-combiner that operates in a reciprocal or complimentary manner so that the encryption process is effectively reversed. The decoded information stream is then output from the decombiner.

In systems of the type just described, security depends, on maintaining the secrecy of the encryption key. As such, one way to enhance security in a private key encryption system is to periodically change the encryption key. Security also depends on the "randomness" of the key stream generated by the pseudorandom bit generators. Generally speaking, greater randomness can be achieved with an algorithm that uses large encryption keys (i.e., more bits) rather than shorter keys. In addition, because the reception site is remote from the transmission site, a secure means must be employed for providing the reception site with the correct encryption key. Typically the encryption key itself may be encrypted and then transmitted to the reception site. Once the key is received at the reception site, it must be stored in a secure memory device at the reception site. Alternatively, the key may be pre-stored in the secure memory.

The number of systems proposed, and in-use, to prevent unauthorized access to subscription programming are too numerous to describe in detail herein. Some systems employ local key generation, but existing schemes are not used for enhanced digital rights management in general, which could include policies, rights and/or rules. For example, U.S. Pat.

No. 5,341,425 uses local key generation to reduce the amount of memory needed at a reception site to store encryption keys under the belief that secure memory is expensive and limited in capacity. Given that modern subscription television systems often involve several providers, each transmitting data to one or more reception sites, each provider will typically will want to employ its own unique encryption keys to encrypt data at its respective transmission site. When the system contains a large number of transmission sites, providing each transmission site with a unique encryption key may become prohibitive. Since it is desirable to employ large encryption keys to increase cryptographic integrity, a problem arises because each of the unique encryption keys must be stored in a secure memory at a reception site so that a decryptor at the reception site is able to decrypt data received from any one of the transmission sites.

In accordance with the '425 patent, a set of data is uniquely encrypted at each of a plurality N of transmission sites for transmission to and subsequent decryption at least one reception site. Each of the N transmission sites is provided with a broadcast key unique to that transmission site and a system key that is the same for all transmission sites. The system key comprises a plurality S of bits and each of the N broadcast keys comprises a unique plurality B of bits, wherein B is less than S. At each transmission site, the system key and the broadcast key unique to that transmission site are convolved in a predetermined manner to generate a unique data encryption key for that transmission site. The unique encryption key generated at each transmission site comprises a third number E of bits, E being at least greater than B. Preferably, E is greater than or equal to S. At each transmission site, a set of data is then encrypted with the unique data encryption key generated at that site. The sets of data uniquely encrypted at each transmission site are then transmitted to the reception site. There is stored, in a memory at the reception site, the system key and each of the broadcast keys to enable a selected one of the encrypted sets of data to be decrypted at the reception site. The memory capacity necessary to store the system key and the broadcast keys at the reception site is no greater than ((N.times.B)+S) bits.

At the reception site, the encrypted set of data transmitted from a selected one of the transmission sites is received. The system key and the broadcast key unique to the selected transmission site are retrieved from the memory at the reception site. Convolving means are provided at the reception site for convolving the retrieved system key and retrieved broadcast key, in the same predetermined manner as was performed at the selected transmission site, in order to reproduce the unique data encryption key employed at the selected transmission site to encrypt the received set of data. The received encrypted set of data may then be decrypted with the reproduced encryption key. Cryptographic strength may be enhanced by periodically changing the system key and or unique broadcast keys provided to each transmission site and stored in the memory at the reception site. The reception site in a subscription television system may be either a cable head-end installation or a subscriber location, such as a cable subscriber or a direct broadcast satellite subscriber.

SUMMARY OF THE INVENTION

This invention improves upon the prior art by providing an audio/video distribution system with enhanced digital rights management. The system, being configured for use with a source of programming, a third party responsible for authorization, and an audio/video output device at a recipient location, broadly includes a source encryptor and a receiver and authentication device disposed at a recipient location.

The source encryptor is responsible for transmitting the programming (plus applicable policies, rights, rules) in encrypted form with missing content to the recipient location. The receiver includes an input for receiving the programming, a decryptor, an output for delivering the programming to the audio/video output device, a bi-directional link for communicating with a third party authenticator, a sensor for receiving a programming request from the programming request device, and a processor.

In response to a request for the programming, the processor is operative to send a signal to the third party, cause the decryptor to decrypt the programming and add the missing content in response to an authorization signal from the third party, and output the programming to the audio/video output device.

To further enhance security, the receiver preferably further includes a local encryptor for encrypting the programming at the recipient location, and a local decryptor for decrypting the programming under control of the processor in response to the authorization signal from the third party. The source encryptor may use various technologies, and may form part of a cable system, satellite system, radio system DVD system, DVB system, or a digital network. The authentication device may also be dedicated or form part of a remote control or universal remote control, telephone or cellular phone, PDA, smartcard or ATM card.

In the preferred embodiment, the communication to or from the authentication device is wireless, including infrared. The communication to or from the authentication device may based on different technologies as well, including an IRDA protocol, dual-tone, multi-frequency (DTMF) protocol, or Bluetooth protocol. Source and/or local encryption may be based on public or private key cryptography or proprietary schemes. Importantly, the third-party authenticator may rely on a credit/debit verification, affording enhanced damages for misappropriation.

As additional security measures, the transmission of the programming may be time-synchronized, such that decryption must occur at a given time or within a given time frame. The receiver may also include one or more devices to detect physical tampering, a memory for storing electronic or physical tampering attempts, and/or a lock that can only be opened by an authorized user.

DETAILED DESCRIPTION OF THE INVENTION

Figure 1:
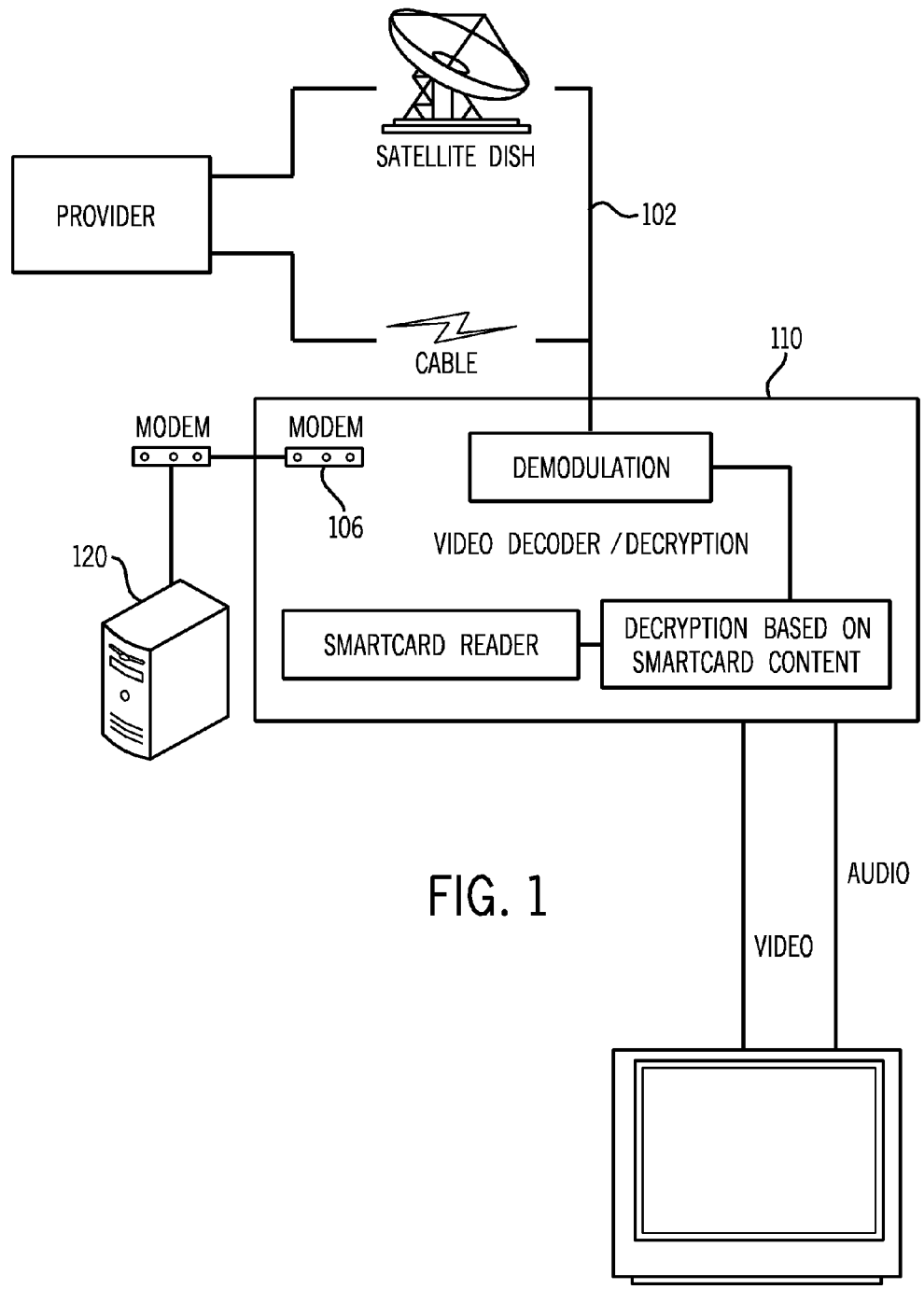
FIG. 1 is a block diagram of a prior-art network architecture applicable to the transmission of the audio/video programming.
Figure 2:
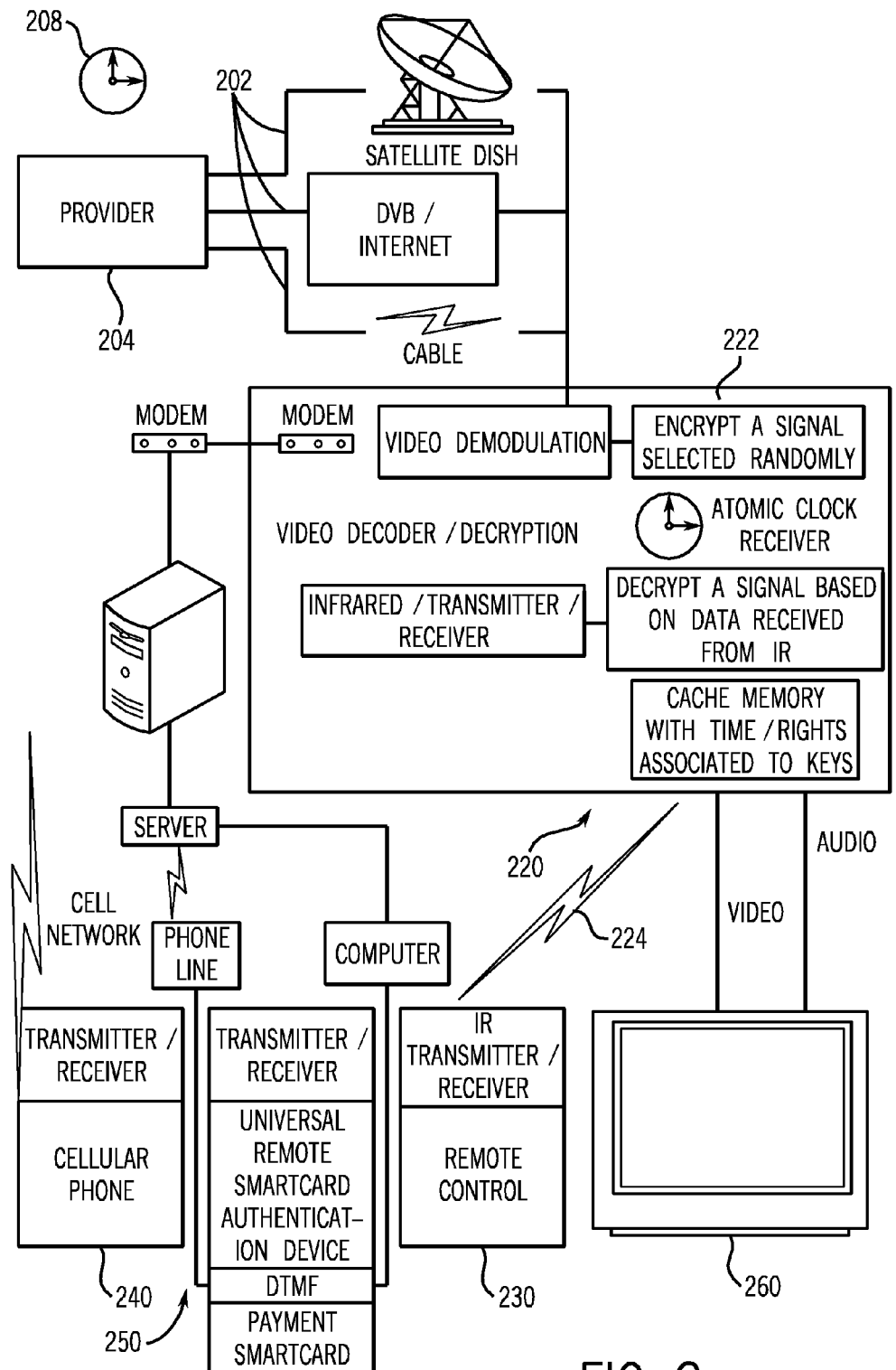
FIG. 2 is a block diagram of a network according to the invention including an embedded rights management capability for enhanced security.

In broad and general terms, this invention merges different technologies to permit a more comprehensive and secure methodology for broadcasting digital video, audio, and other signals that could benefit from enhanced rights management. A preferred embodiment is depicted in FIG. 2, which uses a satellite/cable network architecture based on a novel video/audio decoder according to the invention.

The signal(s) 202 from a provider 204 are individually or globally 'wrapped' in a time envelope based upon a signal generated by an atomic clock 208. An embedded synchronization signal is also added, along with an optional interactive signal, all of which are encoded into the envelope at the time of transmission and decoded at the location of a subscriber. The interactive signal may be used to provide various types of data related to payment, delivery, advertising, and so forth.

The decoder may receive signals from any existing or yet-to-be developed source, including cable, satellite, radio, DVD, DVB, satellite, digital networks, and so on. In the preferred embodiment, the source signal is transmitted with missing content or some other critical aspect (such as audio, color, synchronization, reduced resolution, etc.), such that even if the signal were hacked at the receiving end, a desired signal would not be recovered. The "missing piece" is added at the receiving end as described in further detail below, and to further enhance security, decryption must take place at a specific time coordinated with the atomic clock (or satellite clock), such that an attempted unauthorized decryption at a later time would not be possible.

A video decoder/decryption system 220 provides various functions at the subscriber location. In addition to the operations discussed above, the incoming signal is also encrypted once again, this time locally, thereby causing the received transmission to be unique to each receiver. This local encryption, which is on top of or overlays the already encrypted signal, may use a variety of techniques, both proprietary and standard, including public and private key cryptography. If the received signal is not already encrypted, the supplemental local encryption is likewise automatically disabled on the assumption that the transmission is free. It should be noted that the decoding and encrytion/decryption capabilities provided by the system 200 are preferably implemented in the same circuit to further prevent tampering and hacking.

To decode the transmission for viewing, listening, playing, and etc., the video decoder/decryption system 220 interacts with some form of authentication device, preferably using a wireless infrared signal 224. The authentication device may assume various forms, according to the invention, including remote control or universal remote control 230, telephone or cellular phone 240, PDA or smartcard authentications device 250, ATM cards, and so forth. In each case, an authentication demand is transmitted indicating the desired channel, program, or other qualifying information. The demand may optionally include the key of the decoder.

If the decoder/decryption system is authorized (in accordance with the policy, rights and/or rules) an encrypted key is returned, thereby permitting signal decryption and time synchronization with the desired programming. Various modalities or protocols may be used for the communication between the decoder/decryption system 220 and authentication device, including compliance with the infrared data association (IRDA), dual-tone, multi-frequency (DTMF), Bluetooth, and so forth. Communication may also occur between a smart card and the recipient equipment. In particular, the smart card may be used to store and relate the policy, rights and/or rules information.

The authentication signal provides the missing decryption information needed to permit the programming to be viewed on the display 260 (or listened to in the case of music, or interactivity in the case of games or software). The decoder receives the encrypted authentication signal from the appropriate device and validates the transaction, thereby allowing virtually any video/audio source signal to generate wireless information at a telephone, PDA, computers, X10 or other authentication device.

The system 220 may either receive the missing video and/or audio signals along with an embedded authentication signal (plus applicable policies, rights and/or rules), or the system may receive the authentication signal separately. In any case, this allows the broadcast signal to communicate additional information by way of a remote controls, PDA, computer, X10, TV, video tape, amplifier, and so forth. The subscriber may further optionally receive information such as payment authentication, advertising data, and so forth, via the telephone or other authentication devices including computers, the internet, or the like. The system may accordingly be used to receive product information concerning advertising, payment information, automatic memorization of phone numbers, on specifics products or services received in conjunction with the video/audio signal.

The authentication demand preferably includes a local random parameter plus a serial number based on hardware/software specifications derived from an algorithmic encryption function. The algorithmic encryption function performs a public key and/or private key encryption, then waits for the result to perform the decryption using IBE or classical PKI through the authentication device. Although known public/private encryption schemes are preferably used, the system is not limited in this regard, and may use a randomly selected color as opposed to a number. For example, video may be displayed with specific colors located on specific area on a screen used to communicate digital information. A sensor (i.e., a CCD or photon/phonon sensor with an infrared or other appropriate filter) may be coupled to an infrared LED to receive a wide color wave range and translate this information into data and emit the infrared data at a destination of such devices. This arrangement of two sensors further helps to eliminate alteration due to brightness or saturation thanks to the IR usage and recover error free any color signal emitted. This arrangement also permits any video signal to emit data information at destination of any appropriately equipped sensor device, independently of this invention.

The invention can also generate signals locally dependant on composite data received, and emit these data to a sensor. The invention may also be used to generate IR signals to any device, to perform a payment or an authentication or policy, rights, rules update, in which case the device sends back signals that acknowledge the validation of the transmission. The signals are preferably encrypted in both directions PKI or Identity Based encryption.

The authentication device send back an encrypted signal including the value needed to perform the decryption. This value is calculated in accordance with the received information and cryptographic formulas. The decoder system 220 receives the value in encrypted form, decrypts the value using the appropriate private key and implement this value to perform the decryption of the desired programming signal.

To avoid video or audio signal replication, each communication is serialised through the use of atomic time along with the encryption process. The decoder system 220 may incorporate its own atomic time receiver 222 or, as an alternative, atomic time may be embedded into the signal from the head end to simplify decoder electronics and reduce costs. The synchronization of incoming video allows serialisation of the communication exchange, but only when authorized. The synchronization used by the decoder may further be randomized in accordance with a known time interval or other criteria to further increase signal complexity. As such, to replicate such decoding techniques, a broad knowledge of different technologies is necessary, thus effectively limiting the decoding to a person of extraordinary skill.

In terms of content protection, management rights and rules can be embedded into the various signals to permit broad control on the usage of the signals, including digital output, data duplication and control the usage of the feed once viewed. The decoder may further operate in conjunction with a separate video/audio right management device, allowing or refusing duplication through the introduction of additional countermeasures to prevent and/or trace usage of the audio or video signals.

The system is applicable to various forms of programming, including video on demand, digital video broadcasting and Internet broadcasting, pay per view, video rental, ATM usage, and other areas. Moreover, since the decoder essentially functions as a payment terminal, unauthorized use now becomes a form a monetary fraud with stricter penalties.

To enhance tracing, the decoder system may add stamps to the video/audio signal, and the hardware of the decoder may be protected by a sensor to prevent opening by non-authorized personnel. Tampering or other attempted modifications may be recorded in memory (i.e., through EEPROM programming). To perform maintenance and support, however, the decoders may be opened by authorized individuals using a smartcard reader or other device to examine the recorded information.

I claim:

1. An audio/video distribution system with enhanced digital rights management configured for use with a source of programming, the system comprising:
    a source encryptor for transmitting the programming in encrypted form with missing content such that even if the programming is hacked, the programming is not usable, wherein the encrypted programming is wrapped in a time envelop based upon a signal generated by an atomic clock at a time of said transmitting the programming and includes applicable policies, rights and/or rules associated therewith to the recipient location;
    an authentication device at the recipient location to interact with a third party responsible for authorization of accessing the programming; and
    a receiver at the recipient location, the receiver including:
        an input for receiving the programming,
        an encryptor for encrypting again the programming so that the programming is unique to the receiver,
        a decryptor,
        an output for delivering the programming to the audio/video output device,
        a bi-directional link for communicating with a third party authenticator,
        a sensor for receiving a programming request from the authentication device, and
    a processor operative to:
        a) send a signal to the third party in response to the programming request,
        b) cause the decryptor to add the missing content while decrypting the programming in response to an authorization signal from the third party, wherein the decryptor succeeds only at a specific time specified in the time envelop such that an attempted unauthorized decryption at a later time would not be possible,
        c) cause the decryptor to control the usage in accordance with the policies, rights or rules, and
        d) output the programming to the audio/video output device.

2. The audio/video distribution system of claim 1, wherein the receiver further includes a local encryptor for encrypting the programming at the recipient location, and a local decryptor for decrypting the programming under control of the processor in response to the authorization signal from the third party.

3. The audio/video distribution system of claim 1, wherein the source encryptor forms part of a cable system.

4. The audio/video distribution system of claim 1, wherein the source encryptor forms part of a satellite system.

5. The audio/video distribution system of claim 1, wherein the source encryptor forms part of a radio system.

6. The audio/video distribution system of claim 1, wherein the source encryptor forms part of a radio satellite system.

7. The audio/video distribution system of claim 1, wherein the source encryptor forms part of a DVD system.

8. The audio/video distribution system of claim 1, wherein the source encryptor forms part of a DVB system.

9. The audio/video distribution system of claim 1, wherein the source encryptor forms part of a digital network.

10. The audio/video distribution system of claim 1, wherein the authentication device forms part of a remote control or universal remote control.

11. The audio/video distribution system of claim 1, wherein the authentication device forms part of a telephone or cellular phone.

12. The audio/video distribution system of claim 1, wherein the authentication device forms part of a PDA.

13. The audio/video distribution system of claim 1, wherein the authentication device forms part of a smartcard or ATM card.

14. The audio/video distribution system of claim 1, wherein the communication to or from the authentication device is wireless.

15. The audio/video distribution system of claim 14, wherein the wireless communication is infrared.

16. The audio/video distribution system of claim 1, wherein the communication to or from the authentication device is based on an IRDA protocol.

17. The audio/video distribution system of claim 1, wherein the communication to or from the authentication device is based on a dual-tone, multi-frequency (DTMF) protocol.

18. The audio/video distribution system of claim 1, wherein the communication to or from the authentication device is based on a Bluetooth protocol.

19. The audio/video distribution system of claim 1, wherein the encryptor is based on public or private key cryptography.

20. The audio/video distribution system of claim 1, wherein the local encryptor is based on public or private key cryptography.

21. The audio/video distribution system of claim 1, wherein the third-party authenticator relies on a credit verification.

22. The audio/video distribution system of claim 1, wherein the transmission of the programming is time-synchronized such that decryption must occur at a given time or within a given time frame.

23. The audio/video distribution system of claim 1, wherein the receiver further includes one or more devices to detect physical tampering.

24. The audio/video distribution system of claim 1, wherein the receiver further includes a memory for storing electronic or physical tampering attempts.

25. The audio/video distribution system of claim 1, wherein the receiver further includes a lock that can only be opened by an authorized user.

26. The audio/video distribution system of claim 1, wherein the transmission of the policies, rights or rules originates with the source encryptor or the third party.

27. The audio/video distribution system of claim 1, wherein a use of any of the policies, rights or rules is controlled locally at the recipient location.

28. The audio/video distribution system of claim 1, wherein management of the policies, rights, rules is sent or updated by the source encryptor and or the third party to the recipient location.

29. The audio/video distribution system of claim 1, wherein the policies, rights or rules are transmitted in encrypt fashion and stored encrypted at the recipient location.

30. The audio/video distribution system of claim 1, further being used as a payment system based on video/audio advertising.

31. The audio/video distribution system of claim 1, further being used as a payment/transaction system based on services/video/audio data services, and including banking, weather information or programming guide information.

32. The audio/video distribution system of claim 1, further being used as a payment system on video rentals.

33. The audio/video distribution system of claim 1, further being used as a PPV system based on different possible source of source encryptor, which may include a satellite or cable source.

34. The audio/video distribution system of claim 1, further functioning as a payment system.

35. The audio/video distribution further of claim 1, further functioning as a time-synchronised system.

* * * * *